United States Patent
Kee et al.

(10) Patent No.: US 9,628,549 B1
(45) Date of Patent: Apr. 18, 2017

(54) METHOD AND SYSTEM FOR CONTROLLING AND ACCESSING CONTENT SERVERS

(75) Inventors: Thomas E. Kee, Seattle, WA (US); Donald Joseph DeCaprio, Issaquah, WA (US); Ryan C. Kearny, Kenmore, WA (US); Christian D. Saether, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 103 days.

(21) Appl. No.: 13/475,662

(22) Filed: May 18, 2012

Related U.S. Application Data

(63) Continuation of application No. 10/077,689, filed on Feb. 15, 2002, now Pat. No. 8,204,930.

(51) Int. Cl.
*G06F 15/16* (2006.01)
*H04L 29/08* (2006.01)
*H04L 29/06* (2006.01)

(52) U.S. Cl.
CPC ............ *H04L 67/10* (2013.01); *H04L 29/06* (2013.01); *H04L 67/1014* (2013.01); *H04L 67/288* (2013.01); *H04L 67/2842* (2013.01); *H04L 2029/06054* (2013.01)

(58) Field of Classification Search
CPC ........... H04L 29/06; H04L 2029/06054; H04L 67/2842; H04L 67/10; H04L 67/1014; H04L 67/288
USPC .................................. 709/213, 217, 219
See application file for complete search history.

(56) References Cited

U.S. PATENT DOCUMENTS

| | | | |
|---|---|---|---|
| 5,896,506 A | 4/1999 | Ali et al. | |
| 5,991,810 A | 11/1999 | Shapiro et al. | |
| 5,991,881 A | 11/1999 | Conklin et al. | |
| 6,088,721 A | 7/2000 | Lin et al. | |
| 6,098,096 A | 8/2000 | Tsirigotis et al. | |
| 6,167,438 A | 12/2000 | Yates et al. | |
| 6,370,571 B1 | 4/2002 | Medin, Jr. | |
| 6,449,695 B1 | 9/2002 | Bereznyi et al. | |
| 6,591,274 B1* | 7/2003 | Smith et al. | |
| 6,654,807 B2 | 11/2003 | Farber et al. | |
| 6,842,758 B1* | 1/2005 | Bogrett | |
| 7,133,912 B1* | 11/2006 | Gary | 709/224 |

(Continued)

OTHER PUBLICATIONS

Yoshida, A., "MOWS: Distributed Web Cache Server in Java," Computer Networks and ISDN Systems, vol. 29, 1997, pp. 965-975.

(Continued)

*Primary Examiner* — Oleg Survillo
(74) *Attorney, Agent, or Firm* — John W. Branch; Lowe Graham Jones PLLC

(57) ABSTRACT

A method and system for controlling provisioning and access to cache servers with an application programming interface (API). The API includes components for performing various actions including: (i) prepopulating content on at least one cache server from a content server; (ii) expiring content on at least one cache server; (iii) pinning content in a memory of at least one cache server; (iv) assigning resources on at least one cache server in accordance with a quota; (v) retrieving content from at least one cache server; and (vi) flushing deleted content from at least one selected cache. The API may include a security layer. The security layer determines whether a requestor has permission to cause the requested action to be performed.

23 Claims, 8 Drawing Sheets

(56) References Cited

U.S. PATENT DOCUMENTS

| | | | |
|---|---|---|---|
| 7,392,234 | B2 | 6/2008 | Shaath et al. |
| 7,401,113 | B1* | 7/2008 | Appiah et al. ............... 709/203 |
| 8,108,495 | B1 | 1/2012 | Zuk et al. |
| 2003/0046448 | A1* | 3/2003 | Fischer et al. ............... 709/328 |
| 2003/0103224 | A1* | 6/2003 | Johnson et al. ............. 358/1.13 |
| 2003/0120624 | A1* | 6/2003 | Poppenga et al. ................ 707/1 |
| 2004/0236777 | A1 | 11/2004 | Pardikar et al. |
| 2005/0008003 | A1* | 1/2005 | Ramey et al. ............... 370/352 |
| 2005/0021660 | A1* | 1/2005 | San Andres et al. ......... 709/216 |
| 2005/0219579 | A1* | 10/2005 | Kohler et al. ................ 358/1.9 |
| 2007/0050088 | A1* | 3/2007 | Murray et al. ............... 700/250 |
| 2008/0049971 | A1* | 2/2008 | Ramos et al. ............... 382/100 |
| 2009/0119088 | A1* | 5/2009 | Ferris ............................ 703/23 |
| 2011/0035296 | A1* | 2/2011 | Messer et al. .............. 705/27.1 |
| 2011/0231888 | A1* | 9/2011 | Sequeira ...................... 725/116 |
| 2012/0095898 | A1* | 4/2012 | Kaminsky et al. ............. 705/37 |

OTHER PUBLICATIONS

Nortel Networks, Alleon Content Manager, 2001, pp. 1-5.

Wessels et al., "Application of Internet Cache Protocol (ICP), Version 2," Internet Network Working Group RFC 2187, Sep. 1997, pp. 1-25.

Official Communication for U.S. Appl. No. 10/077,689 mailed Mar. 6, 2006.

Official Communication for U.S. Appl. No. 10/077,689 mailed Jun. 26, 2006.

Official Communication for U.S. Appl. No. 10/077,689 mailed Oct. 6, 2006.

Official Communication for U.S. Appl. No. 10/077,689 mailed May 2, 2007.

Official Communication for U.S. Appl. No. 10/077,689 mailed Jul. 12, 2007.

Official Communication for U.S. Appl. No. 10/077,689 mailed Aug. 23, 2007.

Official Communication for U.S. Appl. No. 10/077,689 mailed May 16, 2008.

Official Communication for U.S. Appl. No. 10/077,689 mailed Dec. 11, 2008.

Official Communication for U.S. Appl. No. 10/077,689 mailed Oct. 5, 2009.

Official Communication for U.S. Appl. No. 10/077,689 mailed Mar. 31, 2010.

Official Communication for U.S. Appl. No. 10/077,689 mailed Nov. 23, 2010.

Official Communication for U.S. Appl. No. 10/077,689 mailed May 13, 2011.

Official Communication for U.S. Appl. No. 10/077,689 mailed Feb. 21, 2012.

* cited by examiner

FIG. 6

| TCP/IP STACK 605 | | | | | | |
|---|---|---|---|---|---|---|
| SECURITY LAYER 610 | | | | | | |
| PREPOPULATE COMPONENT 615 | EXPIRE COMPONENT 620 | PIN COMPONENT 625 | QUOTA COMPONENT 630 | FLUSH COMPONENT 635 | CONTENT COMPONENT 640 | COMMANDS COMPONENT 645 |
| CONTENT SERVER COMMUNICATION LAYER 650 | | | | | | |

600

METHOD AND SYSTEM FOR CONTROLLING AND ACCESSING CONTENT SERVERS

CROSS-REFERENCE TO RELATED APPLICATION

This utility patent application is a continuation of U.S. patent application Ser. No. 10/077,689 filed on Feb. 15, 2002, entitled "Method and System For Controlling and Accessing Content Servers," the benefit of which is claimed under 35 U.S.C. §120, and which is incorporated by reference herein in its entirety.

FIELD OF THE INVENTION

This application relates generally to controlling and updating geographically distributed servers on a network, and, more specifically, to providing access to content servers.

BACKGROUND

Often, source files for Web content servers are coded by multiple programmers on remotely located (stage) source servers. It is not unusual for one or more programmers to code "HTML" files on one source server while one or more other programmers create executable and/or image files on another source server. To provide new or updated content, typically modified or created files are distributed to content servers. Historically, the distribution of a set of "updated" or new files from remotely located source servers through the Internet to content servers has proven to be a difficult task. This task has been further complicated by the lack of control of and access to the content servers.

SUMMARY

In accordance with the present invention, there is provided a method and system for controlling and accessing content servers. An application programming interface (API) (hereinafter sometimes referred to as "interface") receives a request sent from a requestor. The interface is associated with or provides access to one or more content servers. The interface exposes components for manipulating its associated content servers. The interface may be used to perform actions including at least one of prepopulating content on a cache server from content on a content server, expiring content on a cache server, pinning content in memory of a cache server, employing a quota to assign resources on a cache server, retrieving content from a cache server, and flushing deleted content from a cache server.

In one aspect of the invention, each component of the interface provides a particular feature. The prepopulating component prepopulates content on an associated content server. For example, it may fill cache entries on a cache server with content. The expiration component expires content on an associated content server. For example, it may expire one or more cache entries on a cache server. The pinning component pins in memory particular content. For example, it may pin one or more cache entries on a cache server such that they are not replaced by subsequent cache entries. The quota component assigns resources of an associated content server. For example, the quota component may assign a number of cache entries to cache the content of a particular vendor. The flushing component eliminates content on an associated content server. For example, it may remove cache entries on a cache server. The content component provides access to content on an associated content server. For example, it may forward a request for content to a cache server.

In another aspect of the invention, a transceiver provides a request from a requestor to the API and receives content from at least one cache server in response to the request. The request may include one or more actions to be performed by the API. The transceiver may receive content from the API and forward the content to the requestor.

In another aspect of the invention, the security layer may determine whether a requestor has permission to perform an action. If the requestor does not have permission, it may discard a request with or without sending an error message to the requestor.

In another aspect of the invention, the associated content server is located in a foreign network. That is, it is located in a network that is logically separate from the one in which the interface is located. The interface may send messages to the associated content server using another interface located in the foreign network.

In another aspect of the invention, the components of the interface are distributed among a plurality of computers.

Aspects of the invention may be embodied in software and/or hardware and on a computer-readable medium and/or in a modulated data signal.

These and various other features as well as advantages, which characterize the present invention, will be apparent from a reading of the following detailed description and a review of the associated drawings.

BRIEF DESCRIPTION OF THE DRAWINGS

FIG. 6 shows a functional block diagram of an illustrative interface that may be used to access a content server;

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In the following description, first an illustrative operating environment in which the invention may be practiced is disclosed. Then, an illustrative arrangement and interaction of elements using within an operating environment is described. Next, an illustrative interface for accessing content servers is disclosed. Finally, methods for using an interface to access one or more content servers are described.

Illustrative Operating Environment

Figure 1:
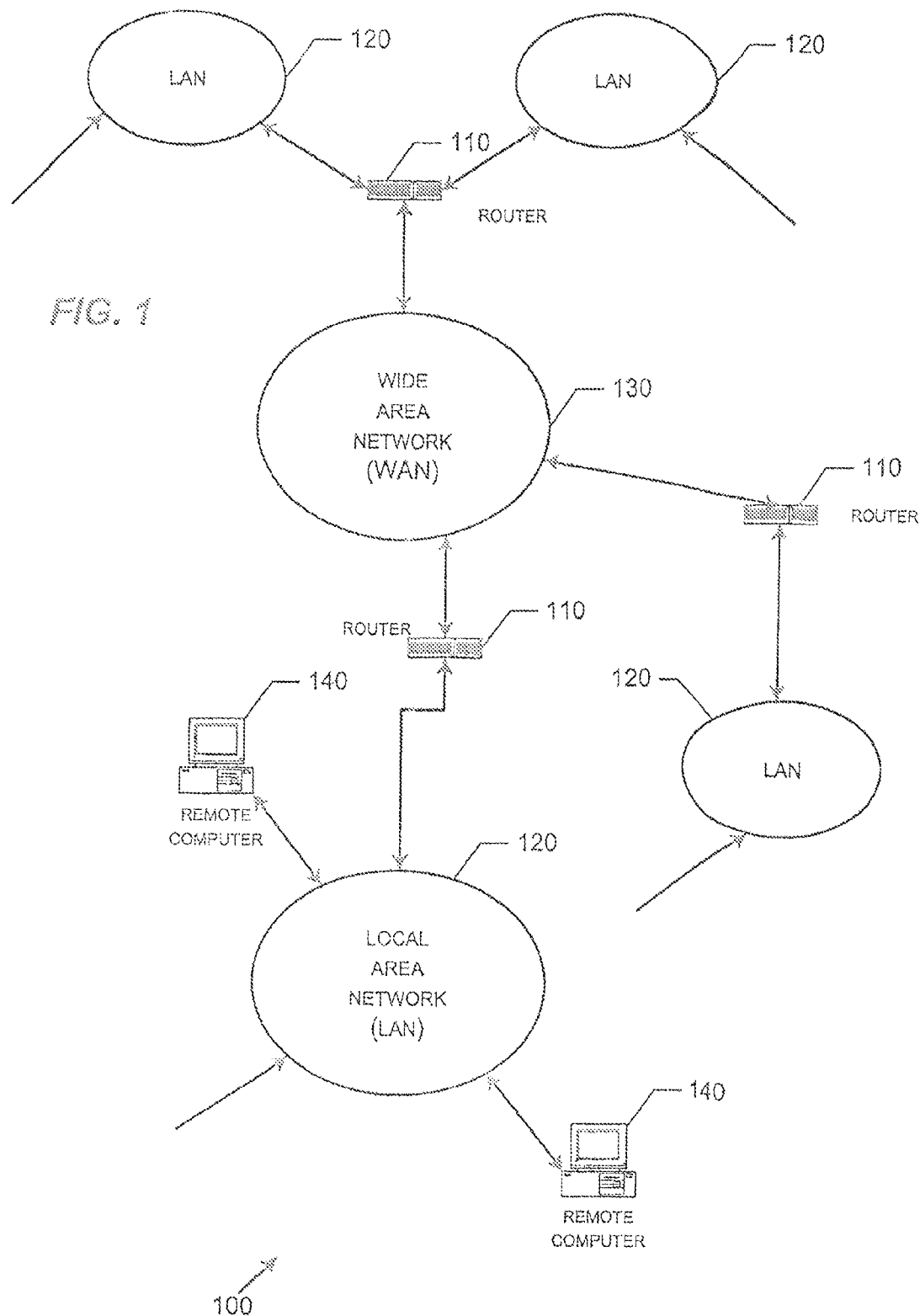
FIGS. 1-3 show components of an exemplary environment in which the invention may be practiced.
Figure 2:
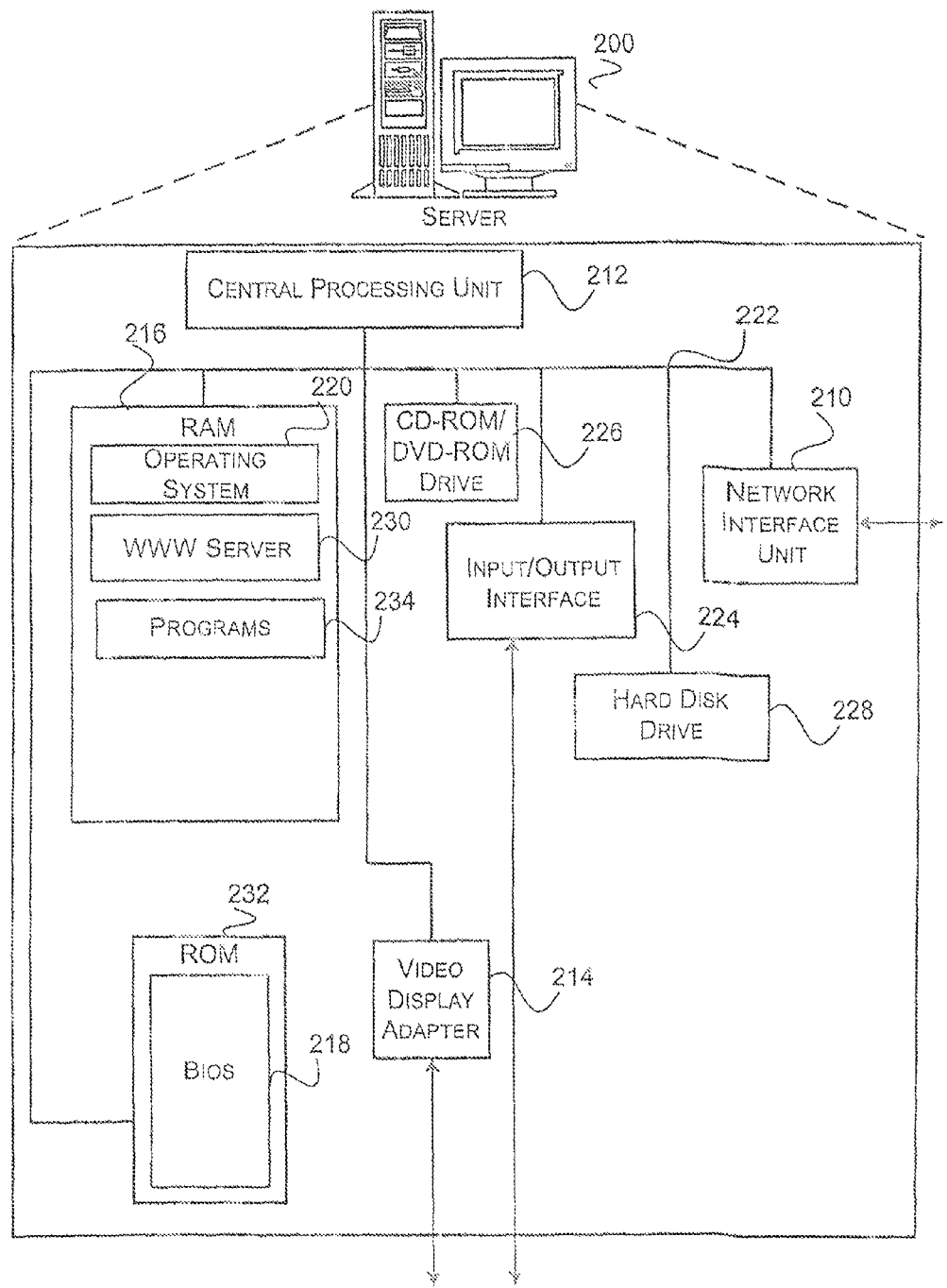
Figure 3:
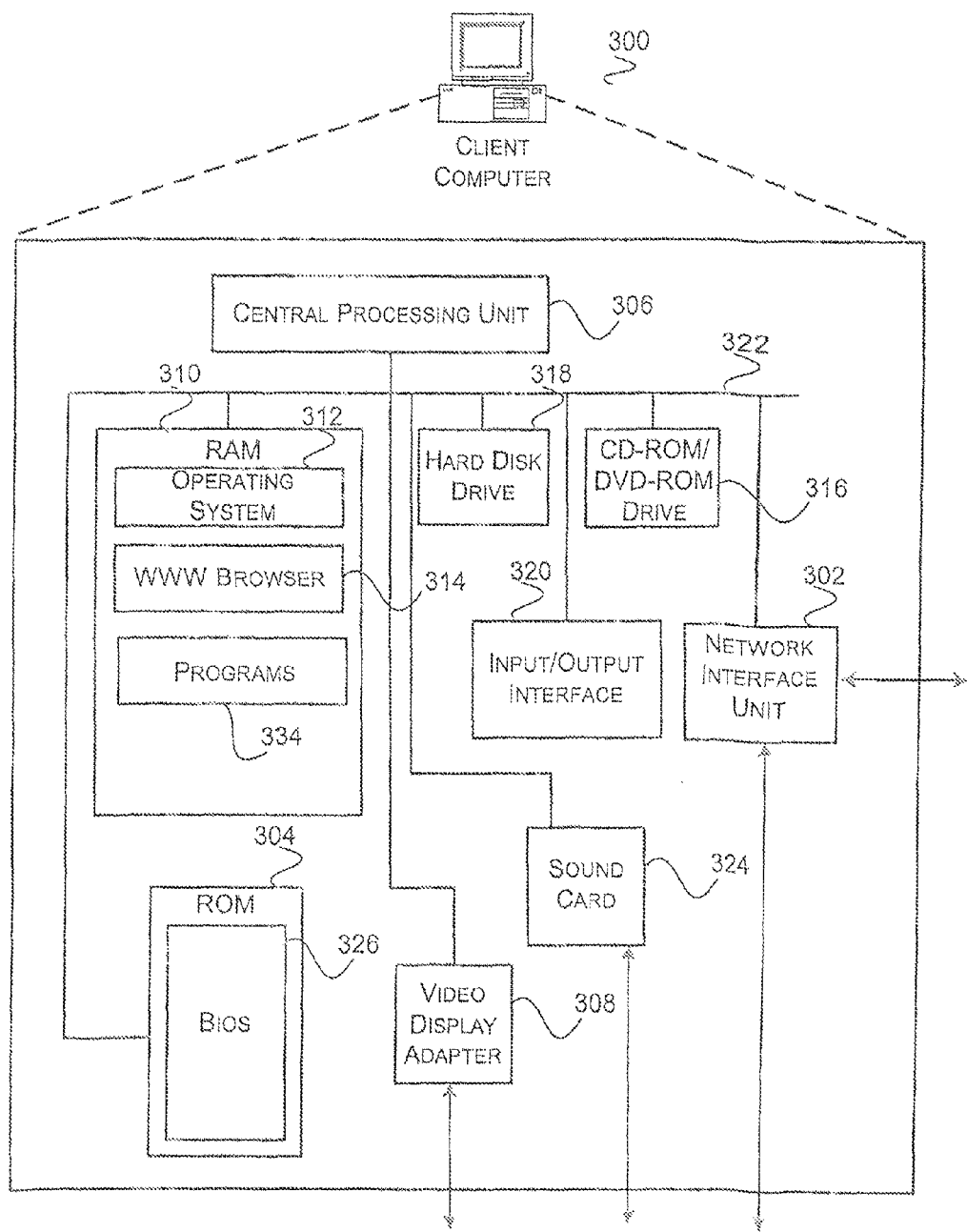

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server providing a WWW site, as the server described in more detail in conjunction with FIG. 2 may, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, among other things. When providing a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network known to those skilled in the art.

Those of ordinary skill in the art will appreciate that the server 200 may include many more components than those shown in FIG. 2. However, the components shown are sufficient to disclose an illustrative environment for practicing the present invention. As shown in FIG. 2, server 200 is connected to WAN/LAN 100, or other communications network, via network interface unit 210. Those of ordinary skill in the art will appreciate that network interface unit 210 includes the necessary circuitry for connecting server 200 to WAN/LAN 100, and is constructed for use with various communication protocols including the TCP/IP protocol. Typically, network interface unit 210 is a card contained within server 200.

Server 200 also includes processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose server operating system as is known to those of ordinary skill in the art, such as UNIX, LINUX™, or Microsoft WINDOWS NT®. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including WWW server application program 230, and programs 234. WWW server application program 230 includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 also comprises input/output interface 224 for communicating with external devices, such as a mouse, keyboard, scanner, or other input devices not shown in FIG. 2. Likewise, server 200 may further comprise additional mass storage facilities such as optical drive 226 and hard disk drive 228. Hard disk drive 228 is utilized by server 200 to store, among other things, application programs, databases, and program data used by WWW server application program 230. For example, customer databases, product databases, image databases, and relational databases may be stored.

FIG. 3 depicts several components of client computer 300. Those of ordinary skill in the art will appreciate that client computer 300 may include many more components than those shown in FIG. 3. However, it is not necessary that those generally-conventional components be shown in order to disclose an illustrative embodiment for practicing the present invention. As shown in FIG. 3, client computer 300 includes network interface unit 302 for connecting to a LAN or WAN, or for connecting remotely to a LAN or WAN. Those of ordinary skill in the art will appreciate that network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Client computer 300 also includes BIOS 326, processing unit 306, video display adapter 308, and memory. The memory generally includes RAM 310, ROM 304, and a permanent mass storage device, such as a disk drive. The memory stores operating system 312 and programs 334 for controlling the operation of client computer 300. The memory also includes WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200, on client computer 300, or on some combination thereof. For example, programming steps may be contained in programs 334 and/or programs 234.

Illustrative Arrangement and Interaction of Elements

Figure 4:
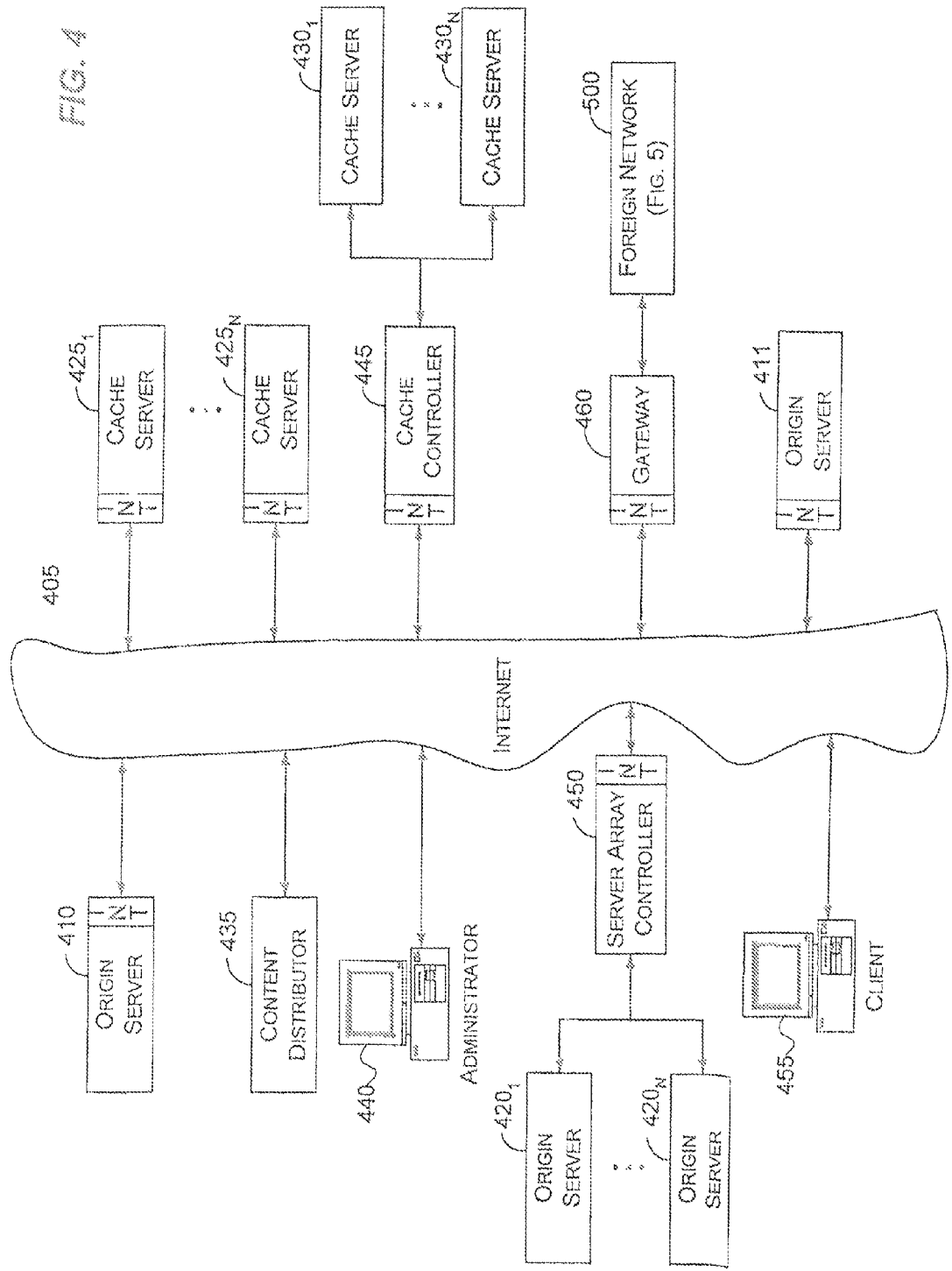
FIG. 4 illustrates an exemplary environment in which the invention operates in which content servers, administrator workstations, client computers, and content distributors are coupled through a wide area network/local area network.

FIG. 4 illustrates an exemplary environment in which the invention operates in which content servers, administrator workstations, client computers, and content distributors are coupled through a wide area network/local area network, according to one embodiment of the invention. The environment includes Internet 405 which is an example of a WAN/LAN, such as WAN/LAN 100 described in conjunction with FIG. 1. In addition, the environment includes origin servers 410-411 and 420$_{1\text{-}N}$, cache servers 425$_{1\text{-}N}$ and 430$_{1\text{-}N}$, content distributor 435, administrator computer 440, cache controller 445, server array controller 450, client computer 455, and gateway 460 each of which are coupled to Internet 405.

Content servers include any server capable of sending content to a requesting device, such as client computer 455. Two such types of content servers are a cache server, such as cache server $425_1$, and an origin server, such as origin server 410. Generally, origin servers are servers which store original (as compared to cached) content. The content stored may be used to generate other content. For example, an origin server may include a database, i.e., original content, having entries about the status of orders. A customer may query the origin server to determine the status of an order placed by the customer. In response to the customer's query, a Web page may be generated that, in addition to the relevant order status, includes advertisements, notices, and/or other information that may be useful to the customer. To conserve storage space and compute resources, such a page is typically generated on request by a program executing on the origin server.

Information about products, such as a product brochure published into a Web page, on the other hand, may be statically stored and not require additional generation. That is, the published Web page showing the product brochure may have no other elements that need to be generated. This is what is generally referred to as a static Web page. Such pages may be created by a Web page developer and then distributed to content servers.

In contrast to origin servers, cache servers cache content and send it to requestors upon request. Generally, cache servers do not generate any additional content than the content they cache (although doing so would not be outside the spirit or scope of this invention). The content may be a copy of content on other servers such as an origin server, a content publishing system (such as content distributor 435), or another cache. By caching frequently requested content, a cache server may greatly decrease the time between a request and a response to the request (known as response latency). Typically, a client, such as client computer 455, may be unaware that the content server responding is a cache server rather than an origin server.

Origin servers, such as origin servers 410-411 and $420_{1-N}$, may be coupled more directly to the Internet or they may be coupled to the Internet through a server array controller, such as server array controller 450. Server array controller 450 may cause origin servers $420_{1-N}$ to appear to requestors as a single origin server. It does this by redirecting a message directed to it to one of origin servers $420_{1-N}$. It may redirect such messages based on many metrics including load balancing metrics. It may perform network address translation (NAT) and/or other translations, such as port address translation (PAT), to maintain the appearance of being a single origin server. Each origin server in FIG. 4 could be replaced with a server array controller controlling an array of origin servers without departing from the spirit or scope of the invention.

Likewise, each cache server, such as one of cache servers $425_{1-N}$ and $430_{1-N}$, may be coupled more directly to the Internet or may be coupled to the Internet through a cache controller, such as cache controller 445. Cache controller 445 may cause cache servers $430_{1-N}$ to appear to requestors as a single unified cache. Similar to a server array controller, it does this by redirecting a message directed to it to one of cache servers $430_{1-N}$. It may redirect such messages based on many metrics including load balancing metrics. It may perform network address translation (NAT) and/or other translations, such as port address translation (PAT), to maintain the appearance of being a single cache server. Each cache server in FIG. 4 could be replaced with a cache controller controlling an array of cache servers without departing from the spirit or scope of the invention. It will be recognized that a cache controller may simply be a server array controller configured to provide access to cache servers.

Cache servers may be arranged in arrays, such as cache servers $425_{1-N}$ and $430_{1-N}$. A device connected to Internet 405, such as a domain name system (DNS) server (not shown), may receive domain name requests from a client or a local domain name system (LDNS) server. The device may direct the client to a cache server or an origin server by returning an IP address associated with the cache or origin server. The device may direct requests depending on network traffic, network topology, capacity of servers, content requested, and a host of other load balancing metrics. The cache servers of cache servers $425_{1-N}$ may be located in one geographical location or may be spread to many different locations. Cache servers $425_{1-N}$ may be coupled to Internet 405 through firewalls or other packet-filtering systems for security and/or other reasons.

Content distributor 435 is a content publishing system. It may provide an automated way for distributing versions of content. For example, it may link to source servers upon which programmers code HTML, executable, and/or image files. Automatically, or upon command, it may gather new or updated content from the source servers. It may store the new or updated content using versioning. Then, it may deliver the new or updated content to content servers. It may coordinate bringing origin servers offline and online and expiring versions of content Administrator computer 440 is an electronic device used to access and control content on content servers. Some of the aspects of content servers that administrator computer 440 controls and accesses are described in more detail in conjunction with FIG. 6. Briefly, administrator computer 440 may be used to prepopulate content, expire content, pin certain content into memory, set quotas, and otherwise manipulate cache servers. Administrator computer 440 may also be used to take origin servers offline or bring them online. It may also be used to update content on the origin servers. An exemplary electronic device that may perform the services of administrator computer 440 is client computer 300 of FIG. 3, configured with appropriate software and hardware.

Client computer 455 requests content from content servers. An application that may be used to request content is a WWW browser application as described in detail in conjunction with FIG. 1.

Administrator computer 440 and client computer 455 may be implemented using any devices capable of connecting with Internet 405 and executing instructions. Such devices may include devices that typically connect using a wired communications medium such as personal computers, multiprocessor systems, microprocessor-based or programmable consumer electronics, network PCs, and the like. Such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. In addition, administrator computer 440 and client computer 455 may also include any device that is capable of connecting using a wired or wireless communication medium such as PDAs, POCKET PCs, wearable computers, and other devices mentioned above that are equipped to use a wired and/or wireless communications medium. An exemplary client that may connect with Internet 405 is client computer 300 of FIG. 3.

Gateway 460 relays messages between foreign network 500 and Internet 405. Such messages may be used to update content servers on foreign network 500. Gateway 460 may be a special purpose gateway constructed specially to pass such update messages, or it may be a gateway that passes many types of messages, including update messages.

Figure 5:
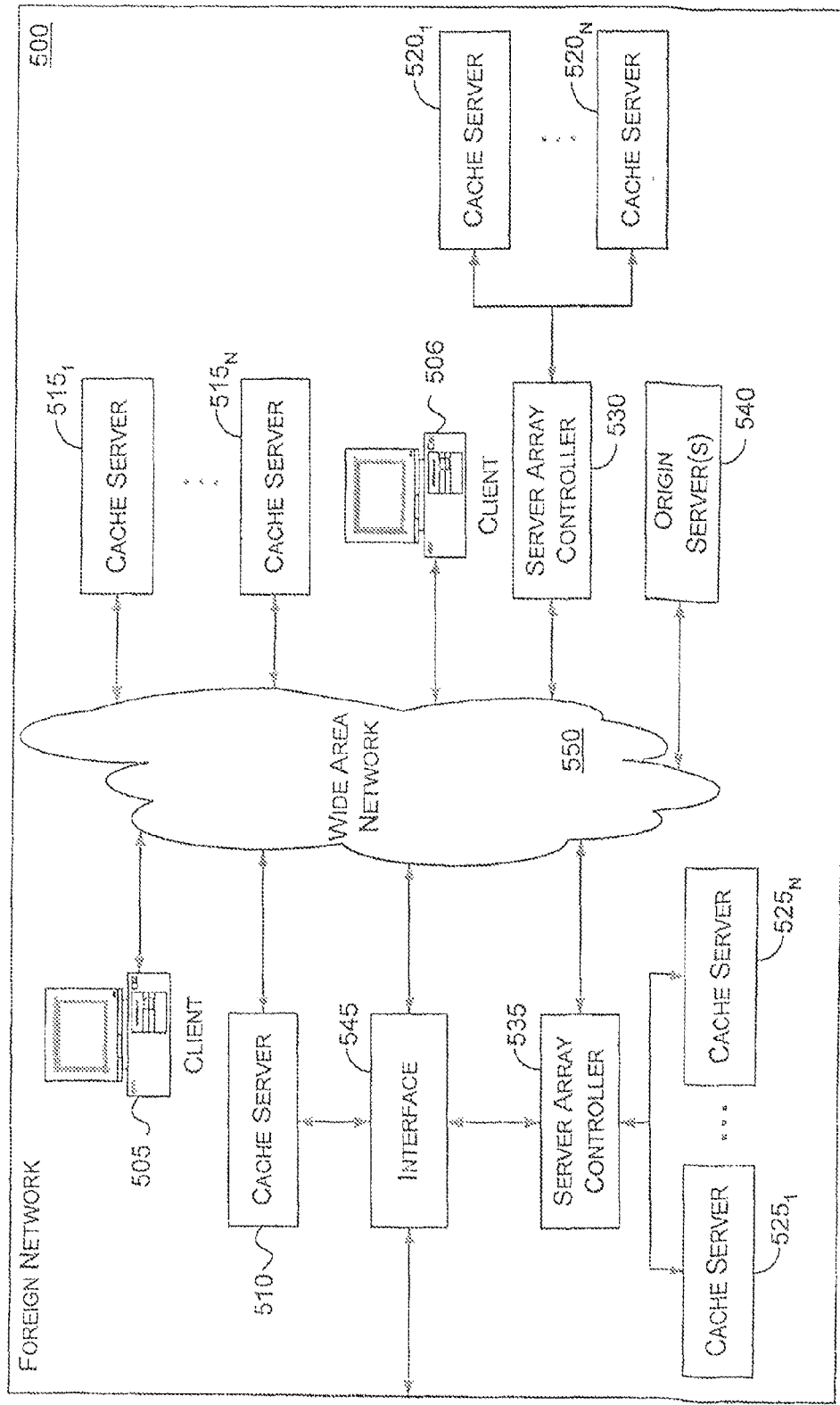
FIG. 5 shows a system on a foreign network that may cache and deliver content.

Foreign network 500 is described in more detail in conjunction with FIG. 5. Briefly, foreign network 500 may be any network that can be coupled to Internet 405 through a gateway such as gateway 460.

Several of the components shown in FIG. 4 have a component (or subcomponent) associated with them labeled "INT" which stands for interface. In one embodiment of the invention, the interface for like components is similar. That is, the interface for origin servers 410 and 411 is identical, while the interface for cache controller 445 is different than the interface for the origin servers. Likewise, the interface for gateway 460 is different than that for server array controller 450.

In another embodiment of the invention, the interface for each component is identical. In this embodiment, however, the interface behaves differently depending on which component it interfaces for. For example, instead of creating a different interface for each component and placing these different interfaces in separate executables, a single interface may be created that can then be distributed to any kind of component and configured to operate appropriately with that component. Interfaces are described in more detail in conjunction with FIGS. 6-8. Briefly, an interface may include a communications layer, a security layer, content server manipulation components, a content interface component, and a content server communication layer. Each interface contains information needed or necessary to propagate a message, such as an update or expire message, to the components or network for which it acts as an interface.

FIG. 5 shows a system on a foreign network that may cache and deliver content, according to one embodiment of the invention. The system includes client computers 505 and 506, cache servers 510, $515_{1-N}$, $520_{1-N}$, $525_{1-N}$, server array controllers 530 and 535, origin server(s) 540, interface 545, and wide area network 550.

The network shown in FIG. 5 might be used when a company provides a dial in service. When a user dials into the service using, for example, client computer 506, the user is connected to a private network. As long as the user accesses content within the network, traffic from and to the user stays within the network shown. When a user tries to access content on another network, such as Internet 405, a determination may be made as to whether that content already exists within the private network on an origin server, such as origin server(s) 540, or on a cache server. If it is determined that the content does exist within the network, the client is directed to the appropriate content server; otherwise, the client's request is forwarded to an external network, such as Internet 405, to fulfill the request.

Client computers 505 and 506 are coupled to wide area network 550 of foreign network 500. They may request content that is supplied by a content server within foreign network 500 or a content server foreign to foreign network 500. Physically, client computers 505 and 506 are similar to client computer 455 of FIG. 4.

Interface 545 provides an interface between foreign network 500 and Internet 405. Interface 545 includes information regarding content servers located in foreign network 500 and how messages may be sent to them. It may be used by a content publishing server or an administrative computer to update or manipulate content servers within foreign network 500. For example, it may receive an expiration message sent from content distributor 435 or administrator computer 440 of FIG. 4. It may then use its knowledge of cache servers on foreign network 500 to propagate the expiration message to cache servers in foreign network 500.

Additionally, interface 545 may be used when a requestor from another network requests content from foreign network 500. Upon receipt of a request, interface 545 may determine a suitable cache server to service the request.

Similarly, interface 545 may be used when a requestor within foreign network 500 requests content from a server on Internet 405. Interface 545 may intercept such a request, determine that a server within foreign network 500 has the requested content, and refer the request to the determined server.

Cache server 510 is coupled to interface 545 and WAN 550 and performs the functions of a cache server, such as cache server $425_1$ of FIG. 4. It may be closely coupled to interface 545 as shown in FIG. 5, so that interface 545 may quickly retrieve and send content from cache server 510 in response to a request.

Cache servers on foreign network 500 may be arranged in arrays, such as cache servers $515_{1-N}$. A device connected to wide area network 550, such as a domain name system (DNS) server (not shown), may receive domain name requests from a client or a local domain name system (LDNS) server. The device may direct the client to a cache server or an origin server by returning an IP address associated with the cache or origin server. The device may direct requests depending on network traffic, network topology, capacity of servers, content requested, and a host of other load balancing metrics. Cache servers $515_{1-N}$ may be located in one geographical location or may be spread to many different locations. Cache servers may be coupled to wide area network 550 through firewalls or other packet-filtering systems for security and/or other reasons.

Server array controllers 530 and 535 make cache servers $520_{1-N}$ and $525_{1-N}$, respectively, each appear to requestors as a single unified cache, similar to how cache controller 445 makes cache servers $430_{1-N}$ appear to requestors as a single unified cache. Server array controller 535 may have requests for content that were previously directed at interface 545 directed to it, while server array controller 530 may have requests for content directed to a server on wide area network 550 directed to it.

Origin server(s) 540 are optional. That is, they may not exist on foreign network 500 at all. When they do exist, they may operate similar to origin server 410-411 as described in more detail in conjunction with FIG. 4.

Wide area network 550 couples various components of FIG. 5 together. It may be implemented in wired and/or wireless technologies. In another embodiment of the invention, wide area network 550 is replaced with a local area network or a wide area network and one or more local area networks. A network exemplary of a wide area network 550 is WAN/LAN 100 of FIG. 1.

Illustrative Interface for Accessing Content Servers

FIG. 6 shows a functional block diagram of an illustrative interface that may be used to access a content server, according to one embodiment of the invention. Interface 600 includes TCP/IP stack 605, security layer 610, prepopulate component 615, expire component 620, pin component 625, quota component 630, flush component 635, content component 640, commands component 645, and content server communication layer 650. Although each of the components is not shown with direct connections to every other component, such connections may exist. Furthermore, each of the components may use any other component or components to perform requested actions. Not all of the components, layers, and stack are required to practice the invention. Furthermore, additional components, layers, and stacks may be added or replace the ones shown without departing from the spirit or scope of the invention.

TCP/IP stack 605 includes the suite of protocols used to communicate with other computers as described in more detail in conjunction with FIG. 1. In essence, TCP/IP stack 605 uses TCP/IP packets and procedures to transmit and receive messages. A higher level protocol, such as HTTP (not shown), may use TCP/IP to transmit and receive messages in interface 600.

Security layer 610 receives messages from TCP/IP stack 605 and determines whether the sender has permission for a requested activity. Security layer 610 may access a database (not shown) or component to determine the permissions of the requestor. To send and receive messages, security layer 610 may use any available security algorithm, including public key/private key encryption using Rivest-Shamir-Adleman (RSA) or Pretty Good Privacy (PGP), Data Encryption Standard (DES), or some other encryption method. Alternatively, security layer 610 may use no encryption to send or receive messages. Security layer 610 may be implemented as a software module, subroutine, component, and/or in hardware. It will be appreciated that security layer 610 may be part of a software program that implements interface 600.

After security layer 610 performs its functions, a message that has passed through it may be sent to one or more of the components shown in FIG. 6. What each of these components does will be described next.

Prepopulate component 615 causes cache entries on one or more cache servers to be updated with new content as appropriate. A cache entry (also called entry) is associated with a subset of content and may include fields including an expiration field and/or a time to live field. An example of a subset of content to which a cache entry may be associated is a Web page. Prepopulating may occur either by pushing the content to a cache server or by expiring a set of cache entries on a cache server and requesting that the cache server request the expired entries, i.e., pull the content from one or more other servers. Prepopulate component 615 facilitates this updating of content. For example, referring to FIG. 4, the interface on cache controller 445 may receive a request from content distributor 435 to prepopulate entries on the cache servers it controls, e.g., cache servers $430_{1-N}$. After passing through TCP/IP stack 605, and security layer 610, this request may be delivered to prepopulate component 615. Prepopulate component uses data that indicates which cache servers are affected, i.e. cache servers $430_{1-N}$, and begins updating content on those cache servers. In doing so, it may establish a communications session with the requestor, content distributor 435, in which it receives new content that content distributor 435 wants to update cache entries with. Cache controller 445 could then push this content to cache servers $430_{1-N}$.

Alternatively, prepopulate component 615 of cache controller 445 may receive a list of cache entries which should be updated on cache servers $430_{1-N}$. Prepopulate component 615 may then use expire component 620 to expire the listed entries. Afterwards, prepopulate component 615 may use commands component 645 to send a command to the caches to pull expired content. Instead, prepopulate component 615 may interact more directly with cache servers $430_{1-N}$. It may send expiration messages without using expire component 620. It may also send a pull command to the caches without using commands component 645.

Prepopulate component 615 may execute as part of an interface serving a single cache server, such as cache server $425_1$. In this case, prepopulate component 615 may use information about the caches it services (only one) to send messages and commands appropriately. Alternatively, prepopulate component 615 may be located on a gateway, such as gateway 460. Gateway 460 is coupled to foreign network 500 and sends messages to it as appropriate. Foreign network 500 includes another interface, interface 545, that is used to propagate messages and commands to content servers on foreign network 500. The interface on gateway 460 may have information about interface 545, such as its capabilities, and may work in conjunction with interface 545 to update content on content servers on foreign network 500.

Prepopulate component 615 may be part of the interface servicing an origin server, such as origin server 411. In this case, prepopulate component 615 may determine that it should not be used to update content on an origin server. In such cases, it may ignore such a command or send the requestor an error.

In one embodiment of the invention, a requestor to update content, such as content distributor 435 or administrator computer 440, has detailed knowledge about the kind of devices behind each interface to which it sends update requests. Using this knowledge, it sends one message to interfaces servicing origin servers, a different message to interfaces servicing a cache server, yet a different message to interfaces on server array controllers or cache controllers, and yet a different message to interfaces on gateways.

In another embodiment of the invention, the requestor simply knows where each interface is located and sends the same message to each interface. Each interface is then able to determine how to deal with the message, e.g. whether to expire and update cache entries on one or more associated cache servers and/or whether to update content on one or more associated origin servers. In other words, the interface includes the "smarts" to determine how to react to a message based on the resources for which it acts as an interface.

Expire component 620 may be used to expire cache entries on a cache server. Simply expiring a cache entry does not mean, necessarily, that the content associated with the entry will be immediately requested by the cache server. Rather, it simply indicates to a cache server that it may need to check for new content if a request for content in the entry is received. For various reasons, such a request may or may not come, and waiting until such a request does come may make more efficient use of network bandwidth. Expire component 620 may use commands component 645 in sending expiration commands, or it may interact more directly with one or more cache servers.

Pin component 625 may be used to "pin" content onto a cache server. Cache servers have limited storage resources. That is, they have a limited main memory size and/or hard drive size. When a cache server has used its available storage resources and it receives a request for content that it does not have, it must determine which cache entry or entries will be removed to make room for the entry caching the content requested. A company using a cache server to cache content may desire to have certain content always available on a storage resource on a cache server. For example, the company may desire to have its home page always available on a cache server. Specifying that certain content should remain on a cache server and should not be removed for other requested content may be accomplished by use of pin component 625. Pin component 625 instructs a cache server that it may not remove pinned cached content to make room for other content. Rather, the cache server must remove other cached content, even if accessed more recently, to make room for the other content.

Pinning may be specified at various levels of granularity. For example, at one level of granularity, a cache server may be instructed to keep certain content in its storage resources. The cache server may determine whether it should store the content in RAM and/or on a mass storage device as long as it keeps the content stored where it can retrieve it. At another level of granularity, a cache server may be instructed to keep certain content in main memory and to keep other content at least on a hard drive.

Pinning may be done on a customer-by-customer basis. For example, several companies may share a cache server. Each company may be allotted a specific portion of the cache server's resources. Within this portion, each company may specify that certain content be pinned in storage resources.

Quota component 630 may be used to assign resources on a customer-by-customer basis. Through quota component 630, a requestor may specify how much of a cache server's resources may be devoted to each customer. Resources include main memory, disk space, compute cycles, queues, and any other resources a cache server may have.

Flush component 635 may be used to eliminate content from a cache server. For example, a customer may desire to have a certain hierarchy of Web pages eliminated from all cache servers. A requestor may specify this hierarchy using flush component 635. Flush component 635 then instructs the caches it interfaces for to remove these pages. Flush component 635 may be used in conjunction with updating content on origin servers. For example, after an update to origin servers, entire content hierarchies may be eliminated. Since such entries should never be requested again, they may be flushed to free resources. Alternatively, flush component 635 may instruct the caches it interfaces for to expire cache entries associated with the content a requestor instructs to flush.

Content component 640 may be used to serve content to a requestor. For example, a requestor, such as client computer 455 of FIG. 4, may request content from a content server. Such requests and responses to such requests could be routed through content component 640. When content component 640 is part of the interface for a cache controller, it could, for example, include load balancing algorithms for determining to which cache server of a cache server array the request should be sent.

Commands component 645 may be used to send commands to and receive responses from one or more content servers. A command may come from an outside requestor, such as content distributor 435 or administrator computer 440, from another component, or from an inside requestor, such as another content server for which commands component 645 is part of an interface. Some exemplary commands that may be sent through commands component 645 include commands to take offline or bring online certain content servers, commands requesting statistical data from content servers, commands placing content servers in alternate modes, such as a different cache entry replacement scheme to use when low on resources, and other commands or instructions useful in managing a content server.

The components of FIG. 6 may be exposed as part of an application programming interface (API). That is, a developer may have a set of executables, objects, or dynamic link libraries (DLLs) that allow the developer to call methods of the components. Using the API, the developer may use the components shown in FIG. 6 to develop custom applications which include a combination of the features available.

The components may be implemented in software as components, modules, or subroutines, in hardware, or some combination thereof. They may have subparts in common with each other, such as shared DLLs, subroutines, etc. They may also be distributed across multiple computers. That is, one component may reside on one computer while another component may reside on another computer. A component may access or use another component using a remote procedure call (RPC). Together, the components may be referred to as a "component layer." One software and/or hardware application may include security layer 610, the components, and content server communication layer 650.

Content server communication layer 650 relays messages from the components to content servers or another interface. It also relays messages from content servers or another interface to the components. It may include a TCP/IP stack or other communications protocol for communicating. It may send data encrypted or unencrypted.

Flowcharts

Figure 7:
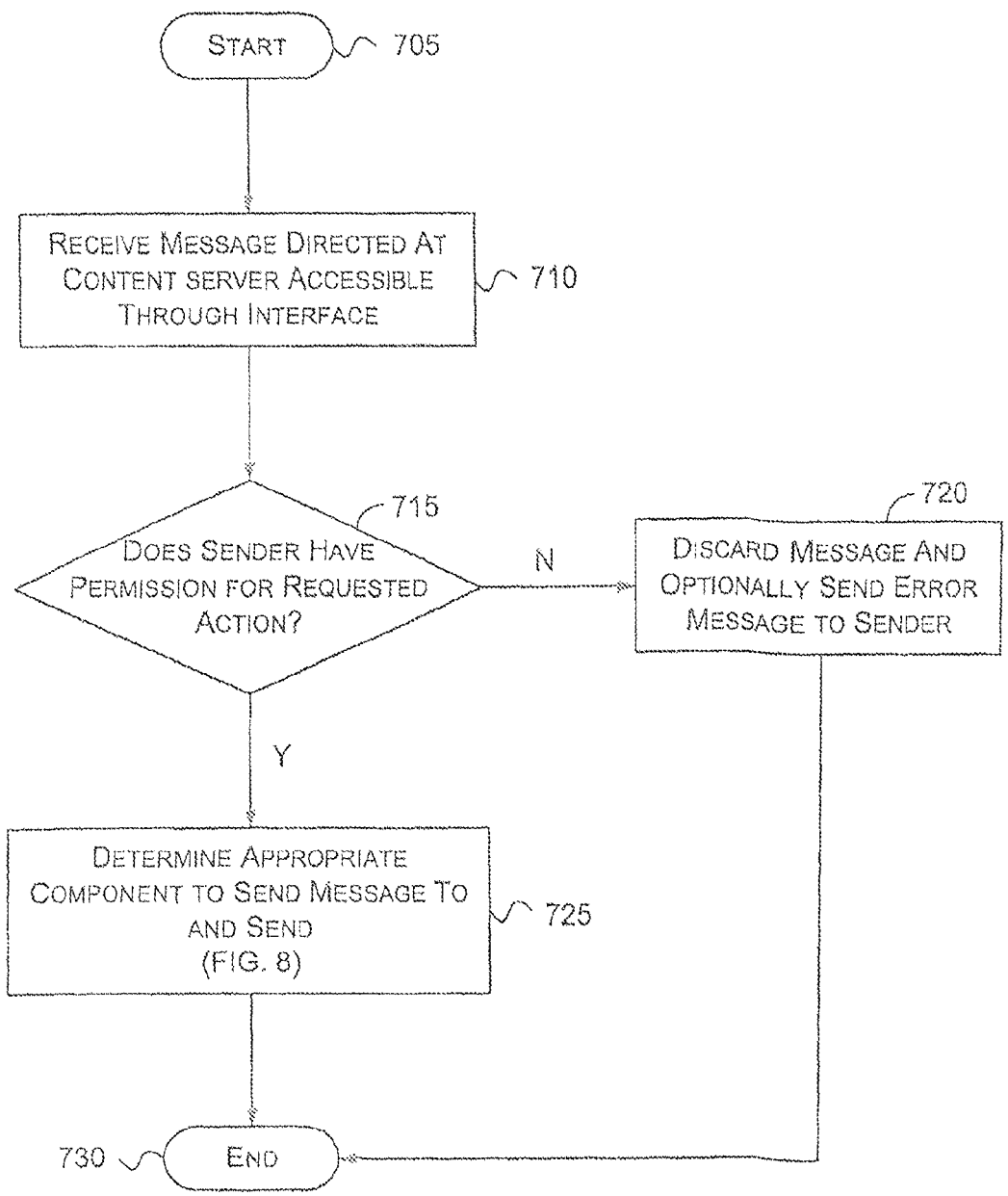
FIG. 7 is a flowchart that shows a process of using an interface to access one or more content servers.

FIG. 7 is a flowchart that shows a process of using an interface to access one or more content servers, according to one embodiment of the invention. The process begins at block 705 when an interface is ready to receive a message.

At block 710, a message is received that is directed at a content server for which the interface provides access. For example, referring to FIG. 4, the interface of cache server 425$_1$ receives a prepopulate message directed at cache server 425$_1$. For purposes of this example, assume that the message comes from content distributor 435.

At block 715, a determination is made as to whether the sender of the message has permission to have the requested action performed. If the sender has permission, processing branches to block 720; otherwise, processing branches to block 725. For example, security layer 610 of FIG. 6 determines whether content distributor 435 of FIG. 4 has permission to cause cache server 425$_1$ to prepopulate cache entries.

At block 720, the message may be discarded and an error message may be sent to the sender. This block is reached if it is determined that the sender did not have permission to cause the action requested to be performed. A security log may be kept of senders of requests and the actions they request. The error message may be sent to inform the sender that it did not have permissions to cause the action to be performed. For example, referring to FIG. 6, security layer 610 discards the message from content distributor 435 of FIG. 4 because it did not have permission to cause cache server 425$_1$ to prepopulate cache entries.

At block 725, the appropriate component to send the message to is determined and the message is sent to the determined component. This process is described in more detail in conjunction with FIG. 8. Briefly, one of the components of FIG. 6 is selected depending on characteristics of the request, and the message is sent to the component selected.

At block 730, the process ends. At this point, a message has been received by an interface. The interface has determined whether the sender has permission to cause the action requested to be performed. If the sender did not have permission, the message was discarded and an error message may be sent to the sender. If the sender did have permission, an appropriate component for handling the message was determined and the message was sent to that component. The process above may be repeated for each message received at an interface.

Figure 8:
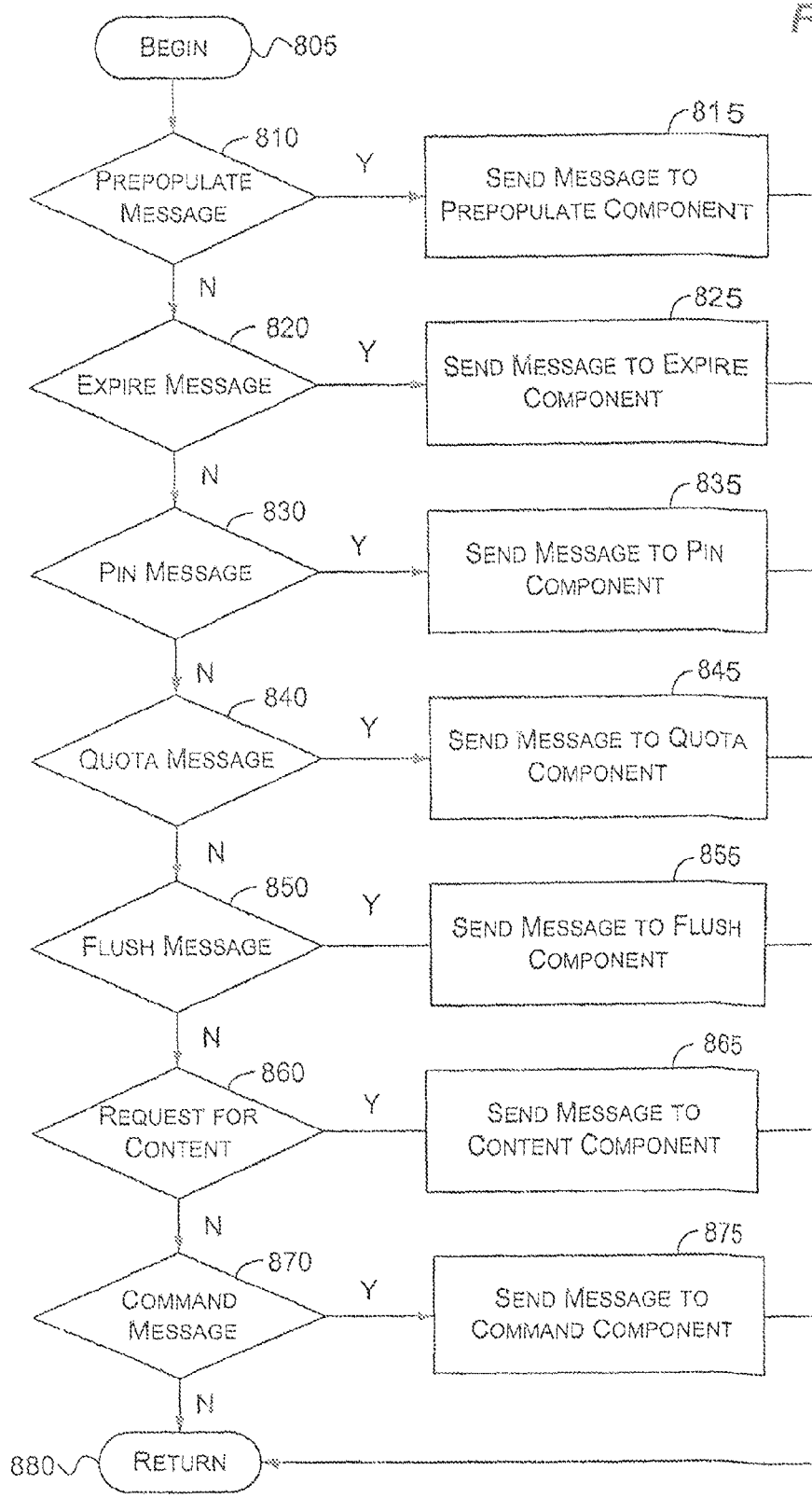
FIG. 8 is a flowchart that shows a process for selecting a component to interact with one or more content servers in accordance with the invention.

FIG. 8 is a flowchart that shows a process for selecting a component to interact with one or more content servers, according to one embodiment of the invention. The process begins at block 805 after a message has been received. After block 805, processing continues at block 810.

At block 810, a determination is made as to whether the message is to prepopulate a cache server. If so, processing branches to block 815; otherwise, processing branches to block 820. For example, referring to FIG. 4, a message is sent from content distributor 435. The message arrives at the interface of cache controller 445. If the message is to prepopulate a cache server, the message is sent to prepopulate component 615 of FIG. 6.

At block 815, the message is sent to prepopulate component 615. Prepopulate component determines whether a push or pull of content will be done on the cache servers with which it is associated and acts accordingly by expiring content and instructing caches servers to pull content or by pushing the content to the cache servers. For example, content distributor 435 may send content to push onto cache servers with a prepopulate command. Upon receipt of the command and content, prepopulate component 615 pushes the content to cache servers.

At block 820, a determination is made as to whether the message is to expire cache entries on a cache server. If so, processing branches to block 825; otherwise, processing branches to block 830. For example, if the message sent from content distributor 435 is to expire cache entries, the message is sent to expire component 620 of FIG. 6.

At block 825, the message to expire cache entries is sent to expire component 620. Expire component 620 then determines which cache servers it is associated with are affected by the expired cache entries and sends expiration messages to them appropriately.

At block 830, a determination is made as to whether the message is to pin content on a cache server. If so, processing branches to block 835; otherwise, processing branches to block 840. For example, if the message sent from content distributor 435 is to pin content on a cache server, the message is sent to pin component 625 of FIG. 6.

At block 835, the message is sent to pin component 625. Pin component 625 sends messages appropriately to cause cache servers it is associated with to pin or lock certain cache content into main memory or into mass memory associated with the cache server. Pinning of content may be done in conjunction with quotas in which a customer specifies that with the resources it is given, certain content should be pinned into memory or in mass memory.

At block 840, a determination is made as to whether the message is to set a quota on a content server. If so, processing branches to block 845; otherwise, processing branches to block 850. For example, if the message sent from content distributor 435 is to set a quota for a particular customer, the message is sent to quota component 630 of FIG. 6.

At block 845, the message is sent to quota component 630. Quota component 630 determines the appropriate associated cache servers that are affected by the quota message and sends messages to them that includes instructions for updated quota requirements.

At block 850, a determination is made as to whether the message is to flush cache entries on a cache server. If so, processing branches to block 855; otherwise, processing branches to block 860. For example, if the message sent from content distributor 435 is to flush cache entries, the message is sent to flush component 635 of FIG. 6.

At block 855, a message is sent to flush component 635. Flush component 635 determines which cache servers which with it is associated are affected by the flush request and sends messages to them instructing them to flush certain cache entries.

At block 860, a determination is made as to whether the message is a request for content. If so, processing branches to block 865; otherwise, processing branches to block 865. For example, if the message sent from content distributor 435 is a request for content, the message is sent to content component 640 of FIG. 6.

At block 865, a message is sent to content component 640. Content component 640 selects a content server to send the request to and forwards the request appropriately. It then sends the response sent from the selected content server to the requestor.

At block 870, a determination is made as to whether the message is a command message not serviced by another component. If so, processing branches to block 875; otherwise, processing branches to block 880. For example, if the message sent from content distributor 435 is for a command or request not serviced by another component, the message is sent to commands component 645 of FIG. 6.

At block 875, the message is sent to commands component 645. Commands component 645 determines whether the requested command is supported or not. If it is supported, it sends messages to one or more content servers to fulfill the command. If it is not supported, it may discard the message and possibly send a response to the requestor indicating that the command is not supported. An example of a command that may come to commands component 645 is one to cause a content server to go offline or online. This may be used, for example, to update content on content servers.

At block 880, the process returns to the calling process. At this point, a determination has been made for an appropriate component to handle a message. The message has been sent to the appropriate component. Error messages may have been generated and sent to the sender of the message. The component selected to handle the message has interacted with content servers to fulfill the request or command delivered in the message. The process above may be called for each message received at an interface.

It will be recognized that a message may include multiple commands or requests. When a message includes multiple commands or requests, the whole message may be sent to each component, which then parses out the part or parts applicable to it, or the message may be divides into pieces with each piece sent to an applicable component.

With each message sent from a component to a content server, an error condition may occur. The component may deal with the error condition and/or send a message to the requestor informing the requestor of the error condition.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit or scope of the invention, the invention resides in the claims hereinafter appended.

What is claimed is:

1. An apparatus, comprising:
a memory for storing executable instructions of an interface that is configured to perform different actions based on a type of component managed by the apparatus; and
a processor that executes the stored executable instructions for the interface to perform actions, including:
detecting the type of component managed by the apparatus for which the interface interfaces based on a resource for which the interface acts as an interface; and
selecting a subset of instructions to perform based on the detected type of component managed by the apparatus and on characteristics of a message sent to the interface, including:
sending an instruction to pre-populate content to at least one cache, the content being obtained from at least one content server;
sending an instruction to pin at least a portion of pre-populated content in at least one cache, one or more quota amounts of memory being allocated in the at least one cache to use for pinned content; and
wherein the pre-populate instruction is sent from a first computing device and the pin instruction is sent from a second computing device.

2. The apparatus of claim 1, wherein the type of component further comprises components that enable the apparatus to operate as one of a cache server, a cache controller, a server array controller, a gateway, or an origin server.

3. The apparatus of claim 1, wherein the processor further sends an other instruction to flush content deleted from the content server from the at least one cache.

4. The apparatus of claim 1, wherein the processor further sends instructions to an application programming interface on the at least one cache server device.

5. The apparatus of claim 1, wherein the processor further sends an other instruction to expire content on the at least one cache.

6. The apparatus of claim 1, wherein the apparatus is configured to operate as an administrator computing device, to administer instructions to one of a cache server or a content server.

7. The apparatus of claim 1, wherein the interface further includes at least one of a network stack, a security layer, a pre-populate component, an expire component, a pin component, a quota component, a flush component, a content component, a commands component, or a content server communications layer.

8. The apparatus of claim 1, wherein the cache is arranged in a memory within a cache server device.

9. An apparatus comprising a non-transitory computer readable medium, having computer-executable instructions stored thereon, that in response to execution by a computing device, cause the computing device to perform operations, comprising:
receiving a message at an interface that is configured to perform different operations based in part on a type of component as which the computing device receiving the message operates, the operations being performed in response to the received message:
detecting the type of component as which the computing device operates based on a resource for which the interface acts as an interface; and
performing a subset of actions based on the detected type of component and on characteristics of a message sent to the interface, including:
pre-populating, by a first computing device, content to at least one cache, the content being received from at least one content server;
expiring, by a second computing device, content on the at least one cache; and
pinning, by a third computing device, a portion of pre-populated content in the at least one cache, wherein one or more quota amounts of memory are allocated in the cache to be used for the pinned content.

10. The apparatus of claim 9, wherein the operations being performed further include:
employing the one or more quotas to assign a plurality of resources on the at least one cache to at least one customer.

11. The apparatus of claim 9, wherein the operations being performed further include:
flushing content deleted from the content server from the at least one cache.

12. The apparatus of claim 9, wherein the operations being performed further include communicating instructions to an interface on the at least one cache.

13. The apparatus of claim 9, wherein the operations being performed further include determining whether a sender of the message is authorized to perform the action requested.

14. The apparatus of claim 9, wherein the computing device comprises at least one of an origin server, a cache server, or a server array controller device.

15. The apparatus of claim 9, wherein the cache is arranged in a memory within a cache server device.

16. A system, comprising:
a plurality of computing devices, each computing device having a processor having an interface that is configured to receive a same message and perform a different operation based on a type of component of the respective computing device that employs the interface, wherein the operations include:
detecting the type of component within the respective computing device employing the interface based on a resource for which the interface acts as an interface; and
based on the detected type of component and on characteristics of a message sent to the interface, performing a subset of operations including:
receiving the message; and
performing an action requested by a sender confirmed to have permission, the action selected based on the detected type of component and comprising:
pre-populating, by a first computing device, content to at least one cache, the content being obtained from at least one content server;
expiring, by a second computing device, content on the at least one cache; and pinning, by a third computing device, at least a portion of pre-populated content in the at least one cache, one or more quota amounts of memory in the at least one cache being allocated to use for the pinned content.

17. The system of claim 16, wherein pre-populating content further includes expiring content on the at least one cache.

18. The system of claim 16, wherein the operations further comprise employing a quota to assign a plurality of resources on the at least one cache to a customer.

19. The system of claim 16, wherein the operations further comprise sending an instruction to flush content deleted from the at least one content server from the at least one cache.

20. The system of claim 16, wherein the operations further comprise communicating instructions to an application programming interface on the at least one cache.

21. The system of claim 16, wherein the operations further comprise retrieving content from the at least one cache server.

22. The system of claim 16, employing at least one encryption mechanism to confirm the t sender of the message has permission.

23. The system of claim 16, wherein the cache is arranged in a memory within a cache server device.

* * * * *